United States Patent
Pappas et al.

(10) Patent No.: US 11,252,535 B1
(45) Date of Patent: Feb. 15, 2022

(54) DEVICE, SYSTEM AND METHOD FOR TRANSMITTING A RESPONSE COMMAND TO A RADIO USING A VISUALIZATION OF LOCATIONS OF RADIOS AND COMMUNICATION LINKS THEREBETWEEN

(71) Applicant: MOTOROLA SOLUTIONS, INC., Chicago, IL (US)

(72) Inventors: Scott J. Pappas, Chicago, IL (US); Peter Gilmore, Plantation, FL (US); Jeffrey Wheeler, Scarborough, ME (US); Jeff Sausman, Chicago, IL (US); Shaun Cavanaugh, Chicago, IL (US); Chantal Levert, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/169,927

(22) Filed: Feb. 8, 2021

(51) Int. Cl.
| | |
|---|---|
| *H04W 4/029* | (2018.01) |
| *H04B 17/27* | (2015.01) |
| *H04W 4/90* | (2018.01) |
| *H04B 17/23* | (2015.01) |
| *H04W 24/00* | (2009.01) |

(52) U.S. Cl.
CPC ............ *H04W 4/029* (2018.02); *H04B 17/23* (2015.01); *H04B 17/27* (2015.01); *H04W 24/00* (2013.01); *H04W 4/90* (2018.02)

(58) Field of Classification Search
CPC .......................... H04W 4/02–029; H04W 4/90
See application file for complete search history.

(56) References Cited

U.S. PATENT DOCUMENTS

| | | | | |
|---|---|---|---|---|
| 8,553,561 B1* | 10/2013 | Chokshi | ................ | H04L 45/122 |
| | | | | 370/238 |
| 8,665,841 B1* | 3/2014 | Goel | ...................... | H04L 69/324 |
| | | | | 370/338 |
| 9,686,664 B1 | 6/2017 | Amason et al. | | |
| 9,743,376 B2* | 8/2017 | Paek | ........................ | H04W 4/02 |
| 10,194,273 B2* | 1/2019 | Xie | ......................... | H04L 67/18 |
| 10,270,727 B2* | 4/2019 | Philipson | ............ | G01C 21/3614 |
| 10,270,899 B1* | 4/2019 | Merjanian | ......... | H04M 1/72424 |

(Continued)

FOREIGN PATENT DOCUMENTS

EP        2197224 A1 *  6/2010  ............ H04W 16/18

*Primary Examiner* — Gennadiy Tsvey
(74) *Attorney, Agent, or Firm* — Perry + Currier, Inc.

(57) ABSTRACT

A device, system and method for transmitting a response command to a radio using a visualization of locations of radios and communication links therebetween is provided. A device generates a visualization of respective locations of radios and communication links therebetween, the visualization distinguishing between the radios that are inside a coverage area of a communication network and a first radio that is outside of the coverage area, the visualization indicating a second radio in communication with the first radio via a local communication link. The device detects an input indicating a response command associated with the first radio. The device determines a routing path from the computing device to a given radio of the radios that are inside the coverage area. The device transmits, to the given radio, via the routing path, the response command.

20 Claims, 6 Drawing Sheets

(56) References Cited

U.S. PATENT DOCUMENTS

| | | | | |
|---|---|---|---|---|
| 2006/0146712 | A1* | 7/2006 | Conner | H04L 45/123 370/235 |
| 2010/0279647 | A1* | 11/2010 | Jacobs | H04W 4/90 455/404.1 |
| 2011/0117878 | A1* | 5/2011 | Barash | G08B 25/005 455/404.2 |
| 2012/0008526 | A1* | 1/2012 | Borghei | H04W 4/022 370/254 |
| 2012/0134347 | A1* | 5/2012 | Kang | H04W 84/18 370/338 |
| 2013/0148752 | A1 | 6/2013 | Kumhyr | |
| 2016/0212682 | A1* | 7/2016 | Chung | H04W 12/06 |
| 2018/0054366 | A1* | 2/2018 | Hashmi | G06F 3/04817 |
| 2018/0295529 | A1* | 10/2018 | Jen | H04L 45/42 |
| 2019/0208381 | A1* | 7/2019 | Booij | G01S 5/0036 |
| 2019/0253868 | A1* | 8/2019 | Zalzalah | H04W 40/22 |
| 2020/0077250 | A1* | 3/2020 | Gideon, III | H04W 4/029 |

\* cited by examiner

DEVICE, SYSTEM AND METHOD FOR TRANSMITTING A RESPONSE COMMAND TO A RADIO USING A VISUALIZATION OF LOCATIONS OF RADIOS AND COMMUNICATION LINKS THEREBETWEEN

BACKGROUND OF THE INVENTION

Radios of public safety personnel, such as police officers, and the like, may not be reachable by a land-mobile radio network and/or a broadband communications network. An incident commander and/or deployed public safety personnel may hence not have all the information they need to make proper command decisions.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
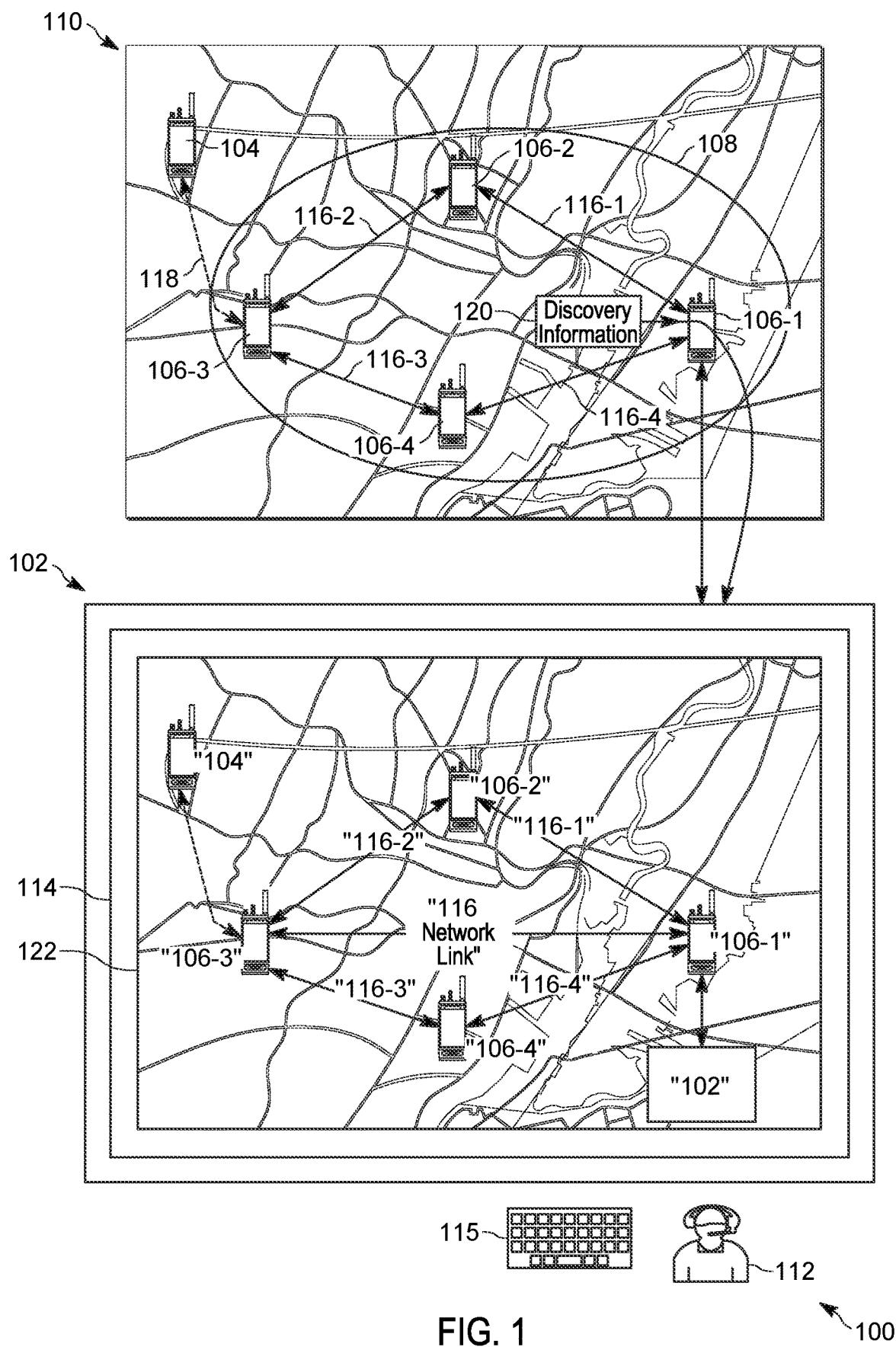
FIG. 1 is a system for transmitting a response command to a radio using a visualization of locations of radios and communication links therebetween, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Radios of public safety personnel, such as police officers, and the like, may not be reachable by a land-mobile radio network and/or a broadband communications network. An incident commander and/or deployed public safety personnel may hence not have all the information they need to make proper command decisions. For example, an attempt to transmit a response command to a radio may fail as such a radio may unknowingly be outside a coverage area of a land-mobile radio network and/or a broadband communications network, and the like. Hence, there exists a need for an improved technical method, device, and system for transmitting a response command to a radio using a visualization of locations of radios and communication links therebetween.

In particular, provided herein is a computing device that may be incorporated with a radio and/or in communication with a radio, the computing device generating a visualization of respective locations of radios and communication links therebetween using, for example, discovery information provided from the radios. Some of the radios may be inside a coverage area of a communication network, while one radio (or more than one radio) may be in communication with one of the radios, that are inside the coverage area, via a local communication link (e.g., a line-of-site communication link, such as two-way radio communication link and/or walkie-talkie communication link). The visualization may be provided at a display screen associated with the computing device and generally distinguishes between radios that are inside the coverage area of the communication network, and a first radio (or first radios) outside of the coverage area. The visualization further indicates a second radio in the coverage area in communication with the first radio via a local communication link. Using the visualization, a user of the computing device (e.g., such as an incident commander, and the like) may understand that the first radio may not be reachable via the communication network; as such, the computing device may be operated to provide an input indicating a response command associated with the first radio, and the computing device may determine a routing path from the computing device to a given radio of the radios that are inside the coverage area; the given radio may comprise the second radio (e.g., in the coverage area) in communication with the first radio via the local communication link, or another radio inside the coverage area. The computing device may transmit, to the given radio, via the routing path, the response command, such that the given radio may transmit the routing command to the first radio via one or more communication links, for example.

An aspect of the present specification provides a method comprising: generating, at a computing device, a visualization of respective locations of radios and communication links therebetween, the visualization distinguishing between the radios that are inside a coverage area of a communication network and a first radio that is outside of the coverage area, the visualization indicating a second radio in communication with the first radio via a local communication link; detecting, at the computing device, an input indicating a response command associated with the first radio; determining, at the computing device, a routing path from the computing device to a given radio of the radios that are inside the coverage area; and transmitting, from the computing device, to the given radio, via the routing path, the response command.

Another aspect of the present specification provides a device comprising: a communication unit; and a controller communicatively coupled to the communication unit, the controller configured to: generate a visualization of respective locations of radios and communication links therebetween, the visualization distinguishing between the radios that are inside a coverage area of a communication network and a first radio that is outside of the coverage area, the visualization indicating a second radio in communication with the first radio via a local communication link; detect an input indicating a response command associated with the first radio; determine a routing path from the computing device to a given radio of the radios that are inside the coverage area; and transmit, by the communication unit, to the given radio, via the routing path, the response command.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for transmitting a response command to a radio using a visualization of locations of radios and communication links therebetween. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

In particular, communication links depicted herein are in two formats. In some examples communication links are depicted in solid lines (e.g., a first format) indicating that such communication links may occur via a communication network such as a land mobile radio (LMR) network, a broadband network and the like, and such communication links may also occur via line-of-site communications and/or a local communication link, and the like, for example when two radios communicate using radio-frequency communications that are not carried via a communication network. In these examples, it is understood that components that are communicating via a such a communication link are in a coverage area of a network and may alternatively communicate via a local communication link.

In other examples, however, communication links are depicted in broken lines (e.g., a second format) indicating that such communication links may occur via line-of site-communications, and the like, and/or a local communication link (which may or may not be line-of-site communications), but not using a communication network. In these examples, it is understood that at least one component that is communicating via such a communication link is outside the coverage area of a communication network and hence cannot (e.g., at least temporarily) communicate via the communication network.

The system 100 comprises a computing device 102 and a plurality of radios 104, 106-1, 106-2, 106-3, 106-4, 106. The radios 106-1, 106-2, 106-3, 106-4 are interchangeably referred to, collectively, as a radio 106 and, generically, as a radio 106; this convention will be used elsewhere in the present specification. In particular, the radios 106 are understood to be inside a coverage area 108 of a communication network, while the radio 104 is understood to be outside the coverage area 108. To distinguish the radio 104 from the other radios 106, the radio 104 is interchangeably referred to hereafter as the first radio 104. As depicted, the radios 104, 106 are depicted in a region 110 (e.g., depicted as having streets, etc.) at locations of the radios 104, 106 in the region 110.

The computing device 102 is depicted as being associated with, and/or in communication with, the radio 106-1. In particular, the computing device 102 may be incorporated into the radio 106-1 and/or the computing device 102 may be separate from the radio 106-1, but may be using the radio 106-1 as a proxy radio for communicating with the other radios 104, 106. However, the computing device 102 may be incorporated with any of the radios 106 (e.g., but not the first radio 104).

In particular, the computing device 102 (e.g., and/or the radio 106-1) may be operated by, and/or associated with, an incident commander 112, and the like, while the other radios 104, 106 may be operated by, and/or associated with, public safety personnel (such as police officers, and the like, not depicted), being commanded by the incident commander 112. As such, the incident commander 112 may operate the computing device 102 to provide response commands to the other radios 104, 106 to instruct associated public safety personnel to respond to incidents, and the like.

The term "response command" as used herein may be understood to include any suitable message and/or communication that may be transmitted to the radios 104, 106, for example to provide information to associated public-safety personnel, which may include, but is not limited to, commands to respond to an incident and/or any other suitable information. Similarly, the term "incident commander" may be understood to include any suitable public-safety personnel who may be using the computing device 102 (e.g., and/or the radio 106-1) to transmit response commands to the other radios 104, 106. Similarly, the term "public-safety personnel" may be understood to include any suitable public-safety personnel such as police, firefighters, emergency medical technicians (EMTs) and the like; however, the term "public-safety personnel" may further include employees of private companies tasked with implementing public-safety type services, including, but not limited to, security companies, and the like. Furthermore, while present examples are described with respect to public-safety personnel, embodiments described herein may be used by non-public-safety type companies, and the like, such as delivery companies and/or any other suitable entity where employees, volunteers, and the like, use radios to communicate and response commands are to be transmitted thereto.

As such the radios 104, 106 may be referred to hereafter as being operated by users, who may be public-safety personnel and/or any other suitable user, and the incident commander 112 may be any suitable user tasked with monitoring the radios 104, 106 via a visualization.

Furthermore, the radios 104, 106 may be associated with each other in any suitable manner. For example, the radios 104, 106 may be members of a same talkgroup and/or the radios 104, 106 may be communicating using a same channel and/or communication channel, and the like. For example, the term channels and/or communication channels, as user herein are understood to include, but not limited to, talkgroups, and the term "channel" and/or "communication channel", as used herein, may include, but is not limited to, a physical radio-frequency (RF) communication channel, a logical radio-frequency communication channel, a trunking talkgroup (interchangeably referred to herein a "talkgroup"), a trunking announcement group, a VOIP (Voice-over-internet-protocol) communication path, a push-to-talk channel, and the like. Indeed, groups of channels may be logically organized into talkgroups, and/or dynamically allocated into talkgroups, though channels in a talkgroup may be dynamic as the traffic (e.g., communications) in a talkgroup may increase or decrease, and channels assigned to the talkgroup may be adjusted accordingly. Such communications via talkgroups and/or channels may occur via the communication links 116, 118.

As depicted, the radios 104, 106 are all mobile radios and/or land-mobile radios however, in some examples, one or more of the radios 104, 106 may be non-mobile; for example, the radio 106-1 may be a radio at a fixed location used to communicate with the other radios 104, 106 on behalf of the computing device 102. In other examples, one or more the radios 104, 106 may be in other formats, such as cell phone-type devices, and the like.

In particular, however, the radios 104, 106 may be configured to communicate both via one or more communication networks, such as an LMR network, a broadband network, and the like, as well as via local communication links; as such the radios 104, 106 may each comprise a combination of an LMR and/or broadband radio, and a two-way radio (e.g., such as a walkie-talkie) and the like.

Furthermore, while five radios 104, 106 are depicted, with four of the radios 106 being inside the coverage area 108 and one radio 104 being outside the coverage area 108, the system 100 may comprise fewer than four radios 106 (e.g., at least one radio 106) inside the coverage area 108 or more than four radios 106 inside the coverage area 108, and/or the system 100 may comprise more than one radio 104 outside the coverage area 108.

As depicted, the computing device 102 may comprise a terminal, and the like, used by the incident commander 112, however, the computing device 102 may comprise a mobile device, such as the radio 106-1, a personal computer, a laptop computer, and the like. Regardless, the computing device 102 is understood to include a display screen 114, such as a flat panel display, and the like, and at least one input device 115 such as a keyboard (e.g., as depicted), a pointing device (e.g., such as a mouse), and the like. The computing device 102 may optionally further comprise a speaker and microphone (e.g., as depicted, provided in the form of a headset worn by the incident commander 112) to verbally communicate with the public-safety personnel operating the radios 106, and the like.

As depicted, the radios 106 in the coverage area 108 are in communication via communication links 116-1, 116-2, 116-3, 116-4 (e.g., communication links 116, and/or a communication link 116), which, as described above, may include communication links via a communication network, such as a broadband network, an LMR network, and the like, and/or the communication links 116 may include local communication links. In particular, while each of the communication links 116 are depicted as being between adjacent pairs of the radios 106, for example indicating local communication links therebetween, the communication links 116 may include communication links between non-adjacent radios 106 via a communication network. Hence, for example, the radio 106-1 may be in direct communication with each of the other radios 106-2, 106-3, 106-4 via network communication links 116, however the radio 106-1 may alternatively communicate with another radio 106 via local communication links 116; for example, as depicted, the radio 106-1 may communicate with the radio 106-3 via a broadband communication link 116, and/or the radio 106-1 may communicate with the radio 106-3 via local communication links 116-1, 116-2 (e.g., via the radio 106-2), and/or the radio 106-1 may communicate with the radio 106-3 via local communication links 116-3, 116-4 (e.g., via the radio 106-4). Hence, the communication links 116 may include network and local communication links 116.

In contrast, the first radio 104 is outside the coverage area 108, which may be due a failure of a base station, and the like, of the communication network outside the coverage area 108, and/or due interference with the communication network at the location of the first radio 104, and the like. Regardless, in FIG. 1, it is understood that the first radio 104 is in communication with the radio 106-3 via a local communication link 118, which may comprise a two-way radio communication link, and the like. Hence, communications between the first radio 104 and the radios 106 generally occurs via the communication link 118 and the radio 106-3. For example, a communication between the first radio 104 and the computing device 102 may occur via one more network and/or local communication links 116 between the radio 106-1 and the radio 106-3, and the local communication link 118 between the radio 106-3 and the first radio 104.

As depicted, the radios 104, 106 may determine local discovery information 120 and transmit the discovery information 120 to the computing device 102 (e.g., as depicted via the radio 106-1). The discovery information 120 is understood to include the respective locations of the radios 104, 106 (e.g., as determined by respective location determining devices, including but not limited to, a Global Positioning System (GPS) device, and the like) and indications of types of the communication links 116, 118 that the radios 104, 106 are using to communicate. For example, a radio 104, 106 may include, in respective discovery information 120 whether a radio 104, 106 is currently using two-way radio communications (e.g., local communication links) only, or is using both two-way radio communications and broadband communications. When a radio 104, 106 is communicating via local communication links only, the discovery information 120 for such a radio 104, 106 may indicate other radios 104, 106 with which such a radio 104, 106 is in communication. Hence, for example, discovery information 120 for the first radio 104 may indicate that that the first radio 104 is in communication with the second radio 106-3.

The discovery information 120 may be transmitted by the radios 104, 106 periodically and/or upon request by the computing device 102 and/or when information at a radio 104, 106 changes (e.g., such as a respective location).

The discovery information 120 may further include, but is not limited to:

signal strength measured by one or more of the radios 104, 106 (e.g., such as Received Signal Strength Indicator (RSSI), and the like), and which may include, but it not limited to, signal strength on one or more of the communications links 116, 118;

signal quality measured by one or more of the radios 104, 106 (e.g., such as a bit error rate (BER), and the like), and which may include, but it not limited to, signal quality on one or more of the communications links 116, 118; in some examples, signal quality may be a better indication of a quality of communications on a communication link 116, 118 as, even if an RSSI is relative high for communication link 116, 118, a high BER may indicate a poor quality of communications;

a number of hops between the radios 104, 106 on respective local communication links 116, 118 therebetween (e.g., a number of local communication links 116, 118 between one radio 104, 106 and another radio 104, 106);

nearest neighbor radios 104, 106 of one or more of the radios 104, 106 (e.g., determined by "pinging" other radios 104, 106 via local communication links 116, 118 and the like);

respective radio types of the radios 104, 106 (e.g., such as land-mobile radios or cell phone-type devices, and/or whether a radio 104, 106 may communicate via both networked and local communication links 116, 118, or only one of networked and local communication links 116, 118, and/or a role of an associated user, and the like, which may be stored at respective memories of the radios 104, 106); and respective capability of the radios 104, 106 (e.g., a list of devices, and the like, such as cameras, microphones, and/or other monitoring devices, of the radios 104, 106, and/or capabilities of an associated user, such as medical training, and the like, which may be stored at respective memories of the radios 104, 106).

While only one set of discovery information 120 is depicted as being received at the radio 106-1, it is understood that a set of discovery information 120 for each of the radios 104, 106 may be received at the radio 106-1 (e.g., which may generate its own discovery information 120), and/or one or more amalgamated sets of discovery information 120 may be received at the radio 106-1 representing discovery information 120 for one or more of the radios 104, 106.

Regardless, the discovery information 120 generally allows the computing device 102 to generate a visualization 122 of respective locations of the radios 104, 106 and communication links 116, 118 therebetween. For example, the visualization 122 is depicted as being rendered at the display screen 114 and includes a map of the region 110; as such, while not depicted, it is understood that the computing device 102 has access to a map database, and the like. As depicted, the visualization 122 further comprises indications, in the form of graphical icons, and the like, at respective locations of the radios 104, 106 on the map. For clarity, the indications of the radios 104, 106 include text a particular radio 104, 106. For example, the indication of the radio 104 is labelled "104", the indication of the radio 106-1 is labelled "106-1"; this convention is used elsewhere in the visualization 122.

The visualization 122 further comprises indications of the communication links 116, 118 between the radios 104, 106, and types thereof, similar to as described above, with indications of the communication links 116 being in solid lines, indicating that respective radios 106 between a communication link 116 are in the coverage area 108, and the indications of the communication link 118 is in dashed lines indicating that the communication link 118 is a local communication link. As depicted, visualization 122 shows local communication links 116 between the radios 106 and one network communication link 116 (e.g., labelled "116 Network Link") between the radios 106-1, 106-3, though it is understood that network communication links 116 may be between all the radios 106.

Hence, as depicted, it is understood that the discovery information 120 includes indications of local communication links 116 between the radios 106 as such local communication links 116 are depicted in the visualization 122. However, in the absence of such indications of local communication links 116 in the discovery information 120, the visualization 122 may omit such indications, but indicate that the radios 106 are in communication via a network communication links 116 in any suitable manner such as showing arrows between all possible pairs of the radios 106 and/or drawing a circle and/or ellipse around the radios 106 (e.g., similar to how the coverage area 108 is depicted in the region 110), among other possibilities.

Hence, the visualization 122 generally distinguishes between the radios 106 that are inside the coverage area 108 of a communication network and a first radio 104 that is outside of the coverage area 108. Furthermore, the visualization 122 indicates a second radio 106-3 in communication with the first radio 104 via a local communication link 118, for example by showing the indication of the local communication link 118 as a dashed line (e.g., a dashed double ended arrow) between the indications for the radios 104, 106-3.

As depicted, the visualization 122 further comprises an indication of the computing device 102 (e.g., labelled with text "102"), as well as an indication of the radio 106-1 that the computing device 102 is using to communicate with the other radios 104, 106, for example, in the form of an indication of a communication link (e.g., a double-ended arrow) between the indications of the computing device 102 and the radio 106-1.

Hence, in general, the incident commander 112 may view the visualization 122 at the display screen 114 to be provided with an indication of radios 106 that are within the coverage area 108, and a first radio 104 (and/or more than one radio) that is outside the coverage area 108.

Hence, when the first radio 104 transmits an indication of distress, and the like, to the computing device 102 (e.g., via the communication links 118, 116, and the radio 106-3), the incident commander 112 may select a given radio 106 from the visualization 122 to which to transmit a response command, for example to provide assistance to a user of the first radio 104. Put another way, the visualization 122 allows a determination of which of the radios 106 (e.g., and associated users) are closest to the first radio 104 such that a given radio 106 may be selected and a response command may be transmitted to the given radio 106 accordingly, for example via a determined routing path between the communication links 116, 118 of the radios 104, 106.

Figure 2:
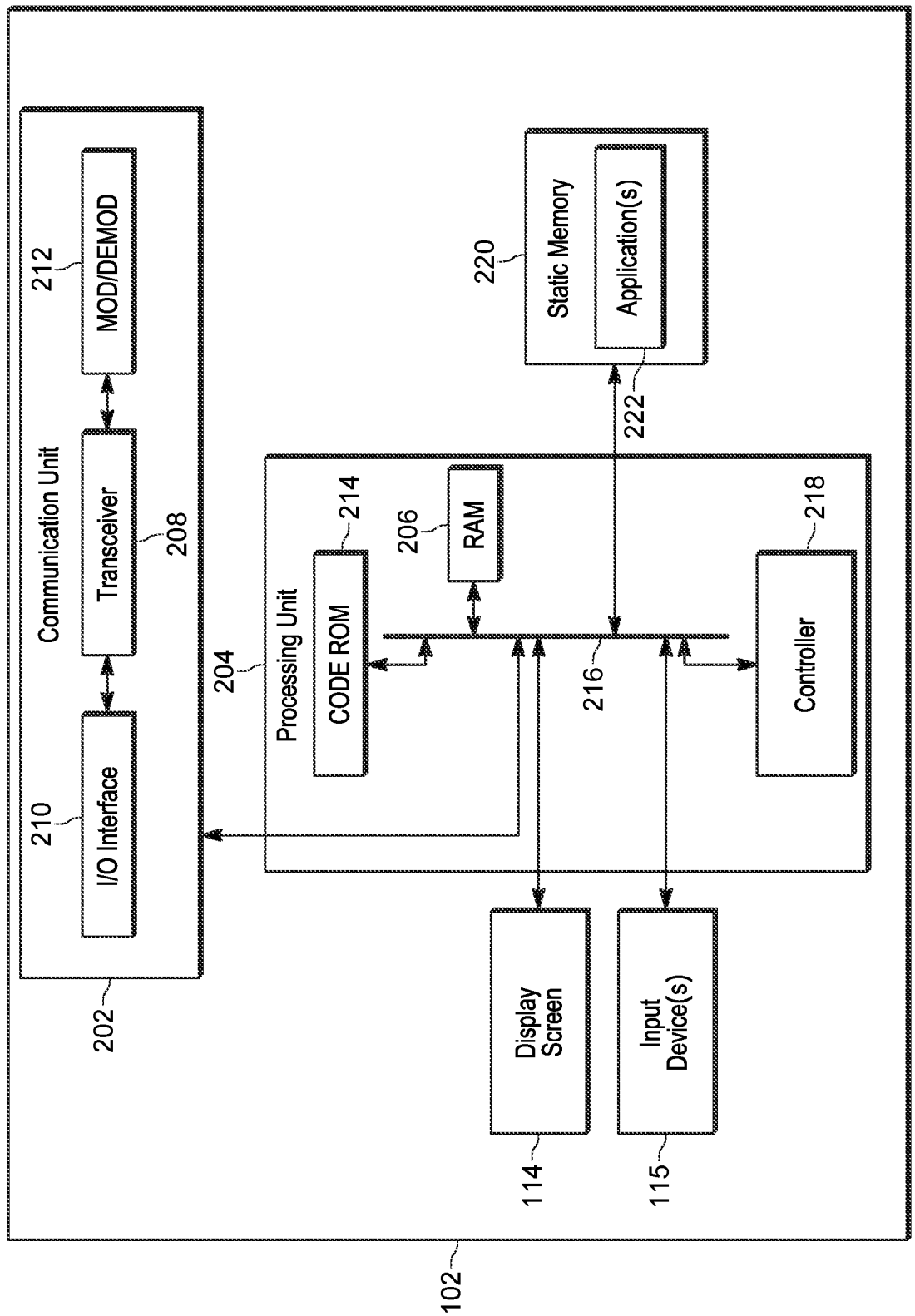
FIG. 2 is a device diagram showing a device structure of a computing device for transmitting a response command to a radio using a visualization of locations of radios and communication links therebetween, in accordance with some examples.

Attention is next directed to FIG. 2, which depicts a schematic block diagram of an example of the computing device 102. In general, the computing device 102 may comprise a radio 106 (e.g., such as the radio 106-1) configured to communicate with the radios 104, 106. However, as depicted, the computing device 102 may comprise a computing device such as a personal computer and/or a laptop computer, and the like in communication with a radio 106 (e.g., as depicted, the radio 106-1).

As depicted, the computing device 102 comprises: a communication unit 202, a processing unit 204, a Random-Access Memory (RAM) 206, one or more wireless transceivers 208 (which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the computing device 102 may have any suitable structure and/or configuration.

As depicted, the display screen 114 and the input device(s) 115 are internal to the computing device 102, however, the display screen 114 and/or the input device(s) 115 may be external to the computing device 102 and in communication with the controller 218 via one or more ports.

As shown in FIG. 2, the computing device 102 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may be included at the computing device 102 and/or the radio 106-1, and may include one or more wired and/or wireless input/output (I/O) interfaces 210 that are configurable to communicate with other components of the system 100. For example, the communication unit 202 may include one or more transceivers 208 and/or wireless transceivers for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

Hence, the communication links 116 may be via any suitable network.

Furthermore, the communication unit 202 may include one or more wireless input/output (I/O) interfaces 210 that are configurable to communicate with other components of the system 100 via two-radio communication links, walkie-talkie communication links and/or any other suitable RF communication link (e.g., including, but not limited to, a line-of-site communication link), such as the communication link 118.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components (e.g., such as the display screen 114 and/or the input device(s) 115).

The controller 218 may include one or more logic circuits, one or more processors, one or more microprocessors, and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for transmitting a response command to a radio using a visualization of locations of radios and communication links therebetween. For example, in some examples, the computing device 102 and/or the controller 218 specifically comprises a computer executable engine configured to implement functionality for transmitting a response command to a radio using a visualization of locations of radios and communication links therebetween.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functional teachings of the computing device 102 as described herein are maintained, persistently, at the memory 220 and used by the controller 218, which makes appropriate utilization of volatile storage during the execution of such programming instructions.

Figure 3:
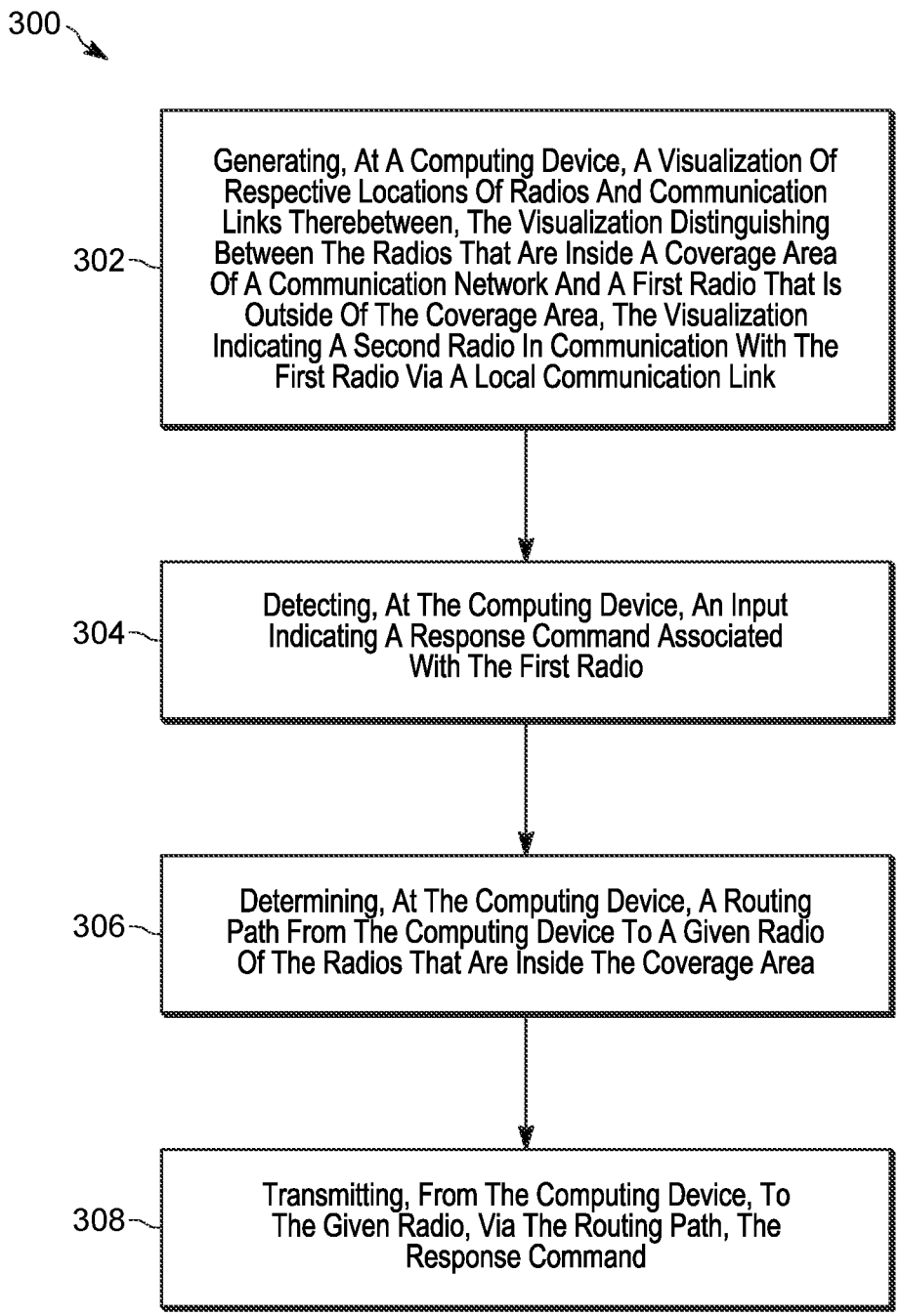
FIG. 3 is a flowchart of a method and/or process for transmitting a response command to a radio using a visualization of locations of radios and communication links therebetween, in accordance with some examples.

In particular, the memory 220 stores instructions corresponding to the at least one application 222 that, when executed by the controller 218, enables the controller 218 to implement functionality for transmitting a response command to a radio using a visualization of locations of radios and communication links therebetween, including but not limited to, the blocks of the process set forth in FIG. 3.

In illustrated examples, when the controller 218 executes the one or more applications 222, the controller 218 is enabled to: generate a visualization of respective locations of radios and communication links therebetween, the visualization distinguishing between the radios that are inside a coverage area of a communication network and a first radio that is outside of the coverage area, the visualization indicating a second radio in communication with the first radio via a local communication link; detect an input indicating a response command associated with the first radio; determine a routing path from the computing device to a given radio of the radios that are inside the coverage area; and transmit, from the computing device 102, to the given radio, via the routing path, the response command.

The application 222 may include programmatic algorithms, and the like, to implement functionality as described herein, which may include, but is not limited to, one or more programmatic algorithms.

Alternatively, and/or in addition to programmatic algorithms, the application 222 may include one or more machine learning algorithms to implement functionality as described herein, and which may include, but is not limited to, a machine learning algorithm. The one or more machine learning models and/or algorithms of the application 222 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments. Any suitable machine learning algorithm and/or deep learning algorithm and/or neural network, and the like, is within the scope of the present specification.

In examples where the application 222 includes one or more machine learning algorithms, the computing device 102 may be operated in a learning mode to "teach" the one or more machine learning algorithms to generate the visualization and/or determine a routing path, and the like.

While the components of the radios 104, 106, are not described in detail, it is understood that components of the radios 104, 106 be similar to the components of the computing device 102, but adapted for respective functionality thereof as described herein. For example, the radios 104, 106 may be configured for two-way radio communication, and the like.

Attention is now directed to FIG. 3, which depicts a flowchart representative of a process 300 for transmitting a response command to a radio using a visualization of locations of radios and communication links therebetween. The operations of the process 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222. The process 300 of FIG. 3 is one way in which the controller 218 and/or the computing device 102 and/or the system 100 may be configured. Furthermore, the following discussion of the process 300 of FIG. 3 will lead to a further understanding of the system 100, and its various components.

The process 300 of FIG. 3 need not be performed in the exact sequence as shown and likewise various blocks may be performed in parallel rather than in sequence. Accordingly, as previously mentioned, the elements of process 300 are referred to herein as "blocks" rather than "steps." The process 300 of FIG. 3 may be implemented on variations of the system 100 of FIG. 1, as well.

At a block 302, the controller 218 and/or the computing device 102, generates the visualization 122 of respective locations of the radios 104, 106 and communication links 116, 118 therebetween, the visualization 122 distinguishing between the radios 106 that are inside the coverage area 108 of a communication network and a first radio 104 that is outside of the coverage area 108, the visualization 122 indicating a second radio 106 (e.g., such as the radio 106-3) in communication with the first radio 104 via a local communication link 118.

For example, as has already been described, the visualization 122 may include graphical icons, and the like, which may indicate locations of the radios 104, 106, as well as types of the communication links 116, 118.

Furthermore, while the visualization 122 has heretofore been described with respect to a two-dimensional space such as a geographical map, the visualization 122 may comprise a three-dimensional space, such as a three dimensional map of a building, and the like, where the radios 104, 106 may be located. Furthermore, such spaces may be mapped to an incident region within which the radios 104, 106 are operating. For example, the region 110 and/or a building, and/the like may be a region at which an incident (e.g., a public-safety incident) is occurring, and hence may alternatively be referred to as an incident region; the radios 104, 106 may be located in such an incident region. Hence, the visualization 122 may comprise a two-dimensional space or a three-dimensional space mapped to an incident region within which the radios 104, 106 are operating. When the visualization 122 is three-dimensional, indications of the radios 104, 106, and the communication links 116, 118, may be three-dimensional and/or at different levels of the visualization 122 and/or such three-dimensional information may be presented in a two-dimensional format.

As has already been described, the visualization 122 may be generated from the discovery information 120. As such, the process 300 may further comprise receiving, at the controller 218 and/or the computing device 102, from the radios 104, 106, the discovery information 120 including the respective locations of the radios 104, 106 and indications of types of the communication links 116, 118, the types of the communication links 116, 118 depending on whether the radios 104, 106 are inside or outside the coverage area 108, and the visualization 122 is understood to be generated from the discovery information 120.

As has already been described, the discovery information 120 may further comprise one or more of: signal strength measured by one or more of the radios 104, 106; signal quality measured by one or more of the radios 104, 106; a number of hops between the radios 104, 106 on respective local communication links therebetween; nearest neighbor radios 104, 106 of one or more of the radios 104, 106; respective radio types of the radios 104, 106; respective capability of the radios 104, 106, among other possibilities. Such information may optionally be provided at the visualization 122, for example as graphical icons and/or as text adjacent indications of the radios 104, 106.

For example, with reference to FIG. 1, the indications of the radios 104, 106 all show the radios 104, 106 as graphical icons representing land-mobile radios; however, one or more of the radios 104, 106 may comprise a cell phone-type device, as indicated in the discovery information 120, and the like and a graphical icon thereof at the visualization 122 may hence indicate a cell phone rather than a land-mobile radio.

It is further understood that as one or more the radios 104, 106 move and/or as their respective locations change, and/or as other changes occur at the radios 104, 106, such as signal strength, signal quality etc., one or more the radios 104, 106 may transmit updated discovery information 120, which may be received in real-time at the computing device 102, which may update the visualization accordingly. As such, the process 300 may further comprise: receiving, at the controller 218 and/or the computing device 102, the discovery information 120 in real-time; and updating the visualization 122 as updated discovery information 120 is received.

At a block 304, the controller 218 and/or the computing device 102, detects an input indicating a response command associated with the first radio 104. For example, as will be explained below, the incident commander 112 may operate input device 115 at the computing device 102 to generate a response command that may be transmitted to a given radio 106 to cause a user of the given radio 106 to assist a user of the first radio 104 in some suitable manner. As such, at the block 304, the controller 218 and/or the computing device 102, may detect an input at the input device 115 indicating a response command associated with the first radio 104; however such an input may be detected in any suitable manner including, but not limited to, receiving voice commands via a microphone of the computing device 102 (e.g., such as at a headset worn by the incident commander 112).

At a block 306, the controller 218 and/or the computing device 102, determines a routing path from the computing device 102 to a given radio 106 of the radios 106 that are inside the coverage area 108.

As will be explained below, the given radio 106 for which a routing path from the computing device 102 is determined may be a radio 106 to which a response command is to be transmitted, for example to provide an instruction to assist, and the like, a user of the first radio 104.

In a particular example, the controller 218 and/or the computing device 102 may receive, from the first radio 104, an indication of distress (e.g., via the communication links 118, 116 and at least the radio 106-3). Such an indication of distress may be received in the form of a message indicating that a user of the first radio 104 is asking for help (e.g., which may be manually initiated at the first radio 104), and the like, and/or indicating that a man-down and/or vest-piercing event, and the like, may have been detected via the first radio 104 (e.g., which may be automatically initiated at the first radio 104). Regardless, the block 306 may be implemented in response to receiving such an indication of distress.

Alternatively, the input device 115 may be operated to provide a selection of the given radio 106, such that the controller 218 and/or the computing device 102 detects such a selection of the given radio 106. For example, an indication of the given radio 106 may be selected from the visualization 122 (e.g., by the incident commander 112 operating the input device 115).

Alternatively, the second radio 106-3 that is in communication with the first radio 104 via the local communication link 118 may be automatically selected as the given radio 106; in particular, the process 300 may further comprise automatically determining the second radio 106-3, in communication with the first radio 104 via the local communication link 118, as the given radio 106 inside the coverage area 108 to which a response command is transmitted. Such an automatic selection of the second radio 106-3 as the given radio 106 may be based on the second radio 106-3 being the radio 106 that is in communication with the first radio 104 via the local communication link 118 and/or the second radio 106-3 being the closest radio 106 to the first radio 104. Alternatively, and/or in addition, automatic selection of the second radio 106-3 as the given radio 106 may be based on capabilities associated with a user of the second radio 106-3 (e.g. such as medical training, among other possibilities) for example as compared to information provided in an indication of distress from the first radio 104 (e.g. such as an indication of a medical emergency, among other possibilities). Furthermore, in examples where there are different routing paths from the computing device 102 to the radios 106 and/or different routing paths from the computing device 102 to one radio 106 (such as the second radio 106-3), automatic selection of a radio 106 as the given radio 106 may be based on a shortest routing path from the computing device 102 to a radio 106, and/or a "best" routing path having a "best" signal strength and/or a "best" signal quality, among other possibilities. However, any suitable combination of factors may be used to automatically select the second radio 106-3 (e.g. or another radio 106), as the given radio 106 inside the coverage area 108 to which a response command is transmitted.

Furthermore, in some examples, the user 112 of the computing device 102 may change an automatically selected radio 106 as the given radio 106, via operation of the input device 115 and the like.

Regardless, the given radio 106 for which the routing path is determined may, in some examples, be understood to be a selected and/or automatically determined radio 106 that may be instructed to assist the user of the first radio 104.

Furthermore, a routing path may be understood to include a combination of one or more communication links 116 from the computing device 102 and/or the radio 106-1, to the given radio 106. For example, as has already been described, the communication links 116 may comprise a combination of network communication links and local communication links, and a routing path may similarly comprise a combination of one or more network communication links and/or one or more local communication links. However, the routing path to the given radio 106, as determined by the controller 218 and/or the computing device 102 may be generally understood to comprise a shortest and/or fastest routing path to the given radio 106, and/or the routing path to the given radio 106, as determined by the controller 218 and/or the computing device 102 may be generally understood to comprise a routing path having a best signal strength and/or a best signal quality.

In particular, as has already been described, the radios 106 are understood to be configured to communicate via a communication network (e.g., via network communication links) and via respective local communication links therebetween. As such, the routing path to the given radio 106, as determined by the controller 218 and/or the computing device 102 may comprises one or more of: the communication network; and a minimum number of the respective local communication links between the radio 106-1 associated with the computing device 102 and the given radio 106. For example, discovery information 120 from the one or more of the radios 106 may indicate that signal strength and/or signal quality of a network communication link 116 may be poor and/or below a threshold value, such that one or more local communication links 116 may be at least temporarily used by such radios 106 in place of network communication link 116; in these examples, the controller 218 and/or the computing device 102 may include such one or more local communication links 116 in the routing path.

However, when a network communication link 116 is available, the routing path may comprise such a network communication link 116. For example, when the given radio 106 comprises the radio 106-3, and a network communication link 116 between the radios 106-1, 106-3 is present, the routing path may comprise the network communication link 116.

At a block 308, the controller 218 and/or the computing device 102 transmits, from the computing device 102 (e.g., by the communication unit 202), to the given radio 106, via the routing path, the response command.

For example, the given radio 106 may be a radio 106 that has been selected, and/or automatically determined, to assist the user of the first radio 104, for example when an indication of distress is received from the first radio 104. As such, the response command transmitted at the block 308 may comprise an instruction to one or more of:
- generate, at the given radio 106, a notification of the indication of distress; for example, the indication of distress may be transmitted to the given radio 106 with the response command.
- travel to a respective location of the first radio 104 to respond to the indication of distress; for example, the response command may include the respective location of the first radio 104 and/or a geographical path to travel to the respective location of the first radio 104 and/or instructions for travelling to the respective location of the first radio 104.
- cause the given radio 106 to activate a monitoring device at the first radio 104, via the second radio 106-3 and the local communication link 118, such that one or more of audio and video detected by the monitoring device is received at the given radio 106, from the first radio 104, via the second radio 106-3 and the local communication link 118. For example, the discovery information 120 may indicate that the first radio 104 includes a camera, a microphone and/or any suitable monitoring device, which enables the first radio 104 to monitor its surroundings (e.g., via images and/or video and/or audio). As such, the controller 218 and/or the computing device 102 may provide an indication, in the response command, of the presence of such a monitoring device to the given radio 106, which may, in response, transmit a request to the first radio 104, to activate such a monitoring device to receive audio and/or video from the first radio 104. However, as the first radio 104 is out of the coverage area 108, communications between the first radio 104 and the given radio 106 are understood to occur via the second radio 106-3 and the local communication link 118. As such, the given radio 106 may receive audio and/or video from the first radio 104 to assist a user of the given radio 106 with determining how to assist the user of the first radio 104.

However, the response command transmitted to the given radio 106 may comprise any suitable information.

Furthermore, in some examples, the given radio 106 may disappear from the visualization 122; for example, the discovery information 120 from the other radios 104, 106 may indicate that the given radio 106 is no longer in communication with the other radios 104, 106. Alternatively, the controller 218 and/or the computing device 102 may remove a radio 104, 106 from the visualization 122 when respective discovery information 120 is not received from a radio 104, 106 within a given time period (e.g., 5 minutes, 10 minutes, 20 minutes, and/or any other suitable time period, which may correspond to a time period larger than a periodicity at which a radio 104, 106 transmits discovery information 120). Alternatively, the controller 218 and/or the computing device 102 may remove a radio 104, 106 from the visualization 122 when no response is received for a request for discovery information 120. Alternatively, rather than remove a radio 104, 106 from the visualization 122, the radio 104, 106 may continue to be indicated at the visualization 122, for example at a last known location thereof, but in manner that indicates that communication has been lost (e.g., and the like) with the radio 104, 106; for example, the radio 104, 106 may be provided in a ghosted manner (e.g., semi-transparent), and the like at a last known location.

In these examples, the controller 218 and/or the computing device 102 may transmit, to the second radio 106-3, that was at least previously in communication with the first radio 104 via the local communication link 118, an instruction to travel to a last known respective location of the first radio 104; in particular, in these examples, the given radio 106 may be different from the second radio 106-3. However, when the second radio 106-3 was determined to be the given radio 106, and the second radio 106-3 disappears from the visualization 122, the controller 218 and/or the computing device 102 may transmit, to a remaining radio 106 that is closest to the first radio 104, an instruction to travel to a last known respective location of the first radio 104.

The process 300 may comprise any other suitable features.

For example, the process 300 may further comprise the controller 218 and/or the computing device 102 providing, at the visualization 122, a link to a further other visualization of respective locations of other radios and respective communication links therebetween, which, when actuated, causes the visualization 122 to be replaced by the further visualization. For example, the controller 218 and/or the computing device 102 may be in communication with the radios 104, 106, and a further group of radios, which may be communicating, at least partially using a same or different communication network as the radios 106 and/or may be associated with a talkgroup different from the talkgroup with which the radios 104, 106 are associated. In these examples, the process 300 may be implemented with the other group of radios to generate the further visualization of the other radios and the respective communication links therebetween. A link (e.g., such as a graphical icon, and the like) to the further visualization may be provided at the visualization 122 to switch to the further visualization and, similarly, link (e.g., such as a graphical icon, and the like) to the visualization 122 may be provided at other visualization to switch to the visualization 122. Furthermore, more than two visualizations may be generated for respective groups of radios, and links to the various visualizations may be provided at the visualizations.

In yet further examples, the process 300 may further comprise the controller 218 and/or the computing device 102 transmitting, to one or more of the radios 104, 106, an indication of the visualization 122 to cause a radio 104, 106, that receives the indication of the visualization 122, to generate a local copy of the visualization 122, for example, which may be rendered at a local respective display screen. As such, a radio 104, 106, that receives the indication of the visualization 122 may also be provided with locations of the radio 104, 106 as well as indications of which radios 104 106 are within, or not within, the coverage area 108.

Furthermore, in some examples, the process 300 may further comprise the controller 218 and/or the computing device 102, in response to losing coverage by the communication network (e.g., for the coverage area 108), updating the visualization 122 to indicate the radios 104, 106 that are in communication via local communication links 116, 118. For example, with reference to FIG. 1, the communication links 116 depicted as solid lines may change to a depiction in broken lines similar to the communication link 118.

Furthermore, when the visualization 122 is locally provided at a radio 104, 106, such a local visualization may be updated to show only radios 104, 106 that are in communication via local communication links, such as nearest neighbor radios 104, 106, and the like, for example based on communications with such nearest neighbor radios 104, 106 via local communication links (e.g., see FIG. 6 described in more detail below).

Figure 4:
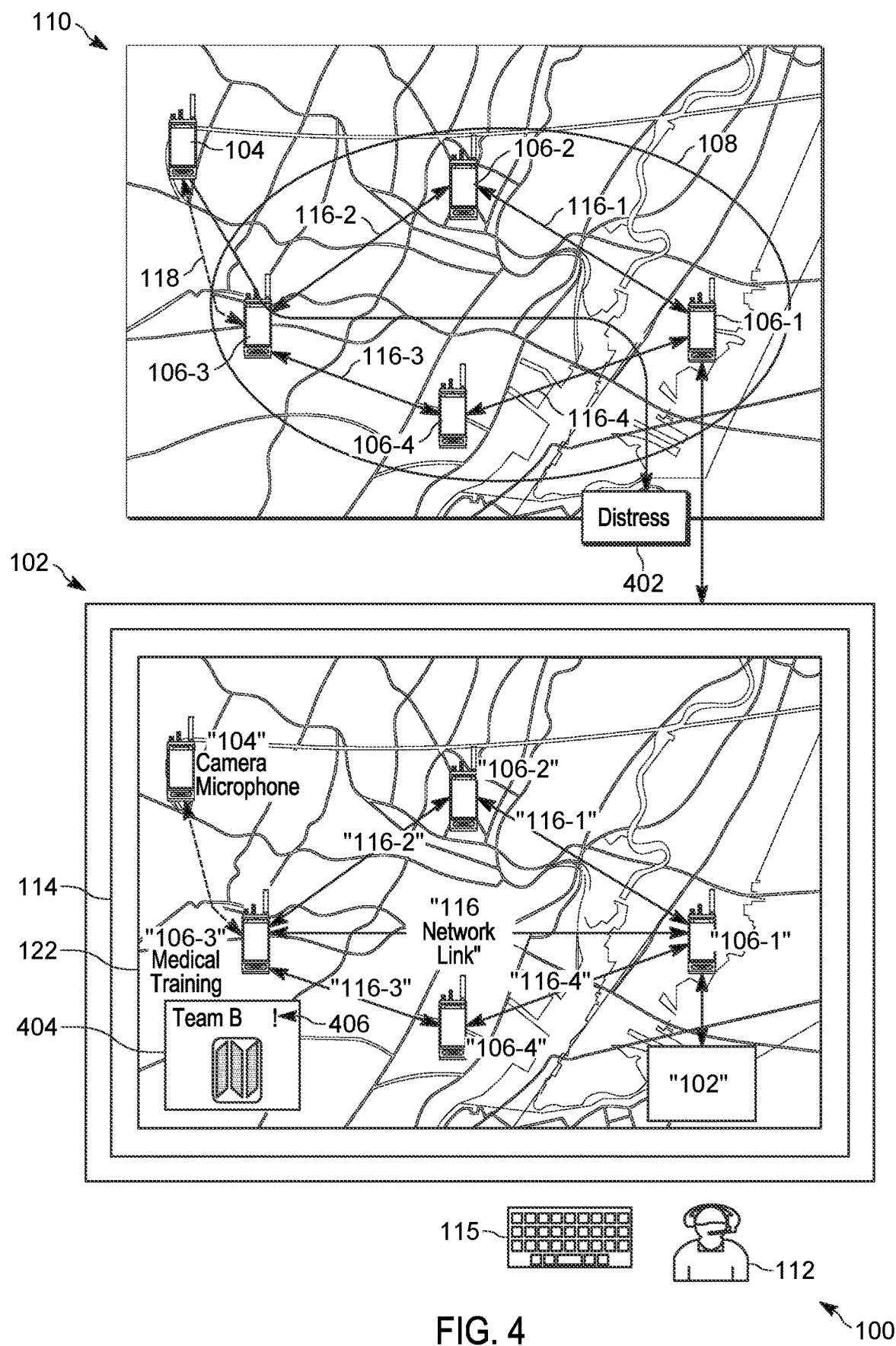
FIG. 4 depicts an example of aspects of a process for transmitting a response command to a radio using a visualization of locations of radios and communication links therebetween implemented in the system of FIG. 1, in accordance with some examples.
Figure 5:
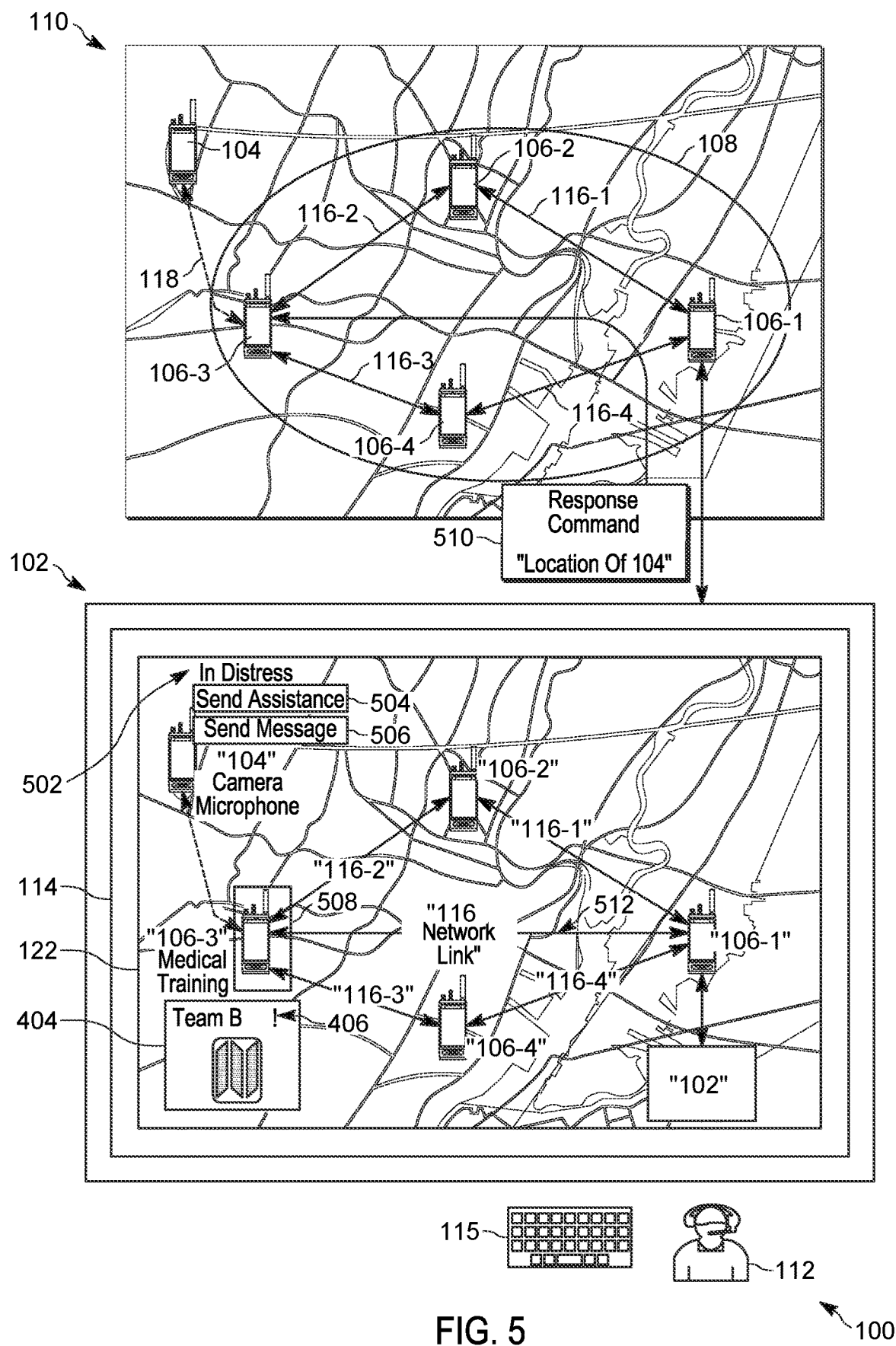
FIG. 5 depicts an example of further aspects of a process for transmitting a response command to a radio using a visualization of locations of radios and communication links therebetween implemented in the system of FIG. 1, in accordance with some examples.

It is understood that FIG. 1 depicts an example of the block 302 as FIG. 1 depicts the computing device 102 having generated the visualization 122 as described above. Attention is next directed to FIG. 4 and FIG. 5, which depict an example of further aspects of the process 300. FIG. 4 and FIG. 5 are substantially similar to FIG. 1 with like components having like numbers.

With attention first directed to FIG. 4, the computing device 102 is depicted as receiving an indication 402 of distress from the first radio 104; as has already been described, the indication 402 of distress may be manually initiated by a user of the first radio 104 and/or the indication 402 of distress may be automatically initiated when a man-down event, a vest-pierce event, and the like, is detected via the first radio 104. The indication 402 of distress may further indicate such a man-down and/or vest-piercing event, and the like.

As is also seen in FIG. 4, the visualization 122 has been updated to show capabilities of the first radio 104 and in particular that the first radio 104 includes a camera and a microphone, which may be determined via the discovery information 120 and/or updated discovery information 120. Similarly, the visualization 122 has been updated to show capabilities associated with a user of the second radio 106-3, and in particular that user of the second radio 106-3 has medical training, which may be determined via the discovery information 120 and/or updated discovery information 120. Alternatively, while not depicted, such information may be retrieved by the computing device 102 from an employee database and the like.

As depicted, the visualization 122 has been further updated to provide an optional link 404 to a further visualization of a further group of radios (e.g., "Team B" as the radios 104, 106 may be a "Team A"), as described above. As depicted, the link 404 includes an indication 406 (e.g., an exclamation point) that an indication of distress has been received by a radio of the other group of radios, such that the incident commander 112 may switch to the further visualization and also implement the process 300, as described hereafter.

Attention is next directed to FIG. 5, which depicts the visualization 122 being further updated in response to receiving the indication 402 of distress. In particular, the visualization 122 has been updated to show that a user of the first radio 104 is in distress and/or that the indication 402 of distress was received, via an indication 502 (e.g., text "In Distress") adjacent the indication of the first radio 104. The indication 502 further includes an electronic button 504, which, when actuated via the input device 115, and the like, corresponds to input being detected (e.g., at the block 304 of the process 300) indicating a response command associated with the first radio 104, for example to "Send Assistance" to the first radio 104. As depicted, the indication 502 further includes an electronic button 506, which, when actuated via the input device 115, and the like, may initiate a message from the computing device 102 to the first radio 104.

As also depicted in FIG. 5, a box 508 is depicted around the second radio 106-3 indicating that the second radio 106-3 has been determined to be a given radio 106, to which a response command 510 is to be transmitted. The second radio 106-3 may be selected automatically by the computing device 102, for example in response to the electronic button 504 being actuated and/or the second radio 106-3 may be selected via the input device 115 in conjunction with the electronic button 504 being actuated. In some examples, another radio 106 may have been initially automatically selected as the given radio 106 and the user 112 may have chanted such an automatic selection to the second radio 106-3 via the input device 115. Furthermore, the second radio 106-3 may be selected as the given radio 106, to which a response command 510 is to be transmitted, based on a user of the second radio 106-3 having medical training and the indication 402 of distress indicating a medical issue with the user of the first radio 104 (e.g. such as a man-down and/or vest-piercing event, and the like). However, the second radio 106-3 may be selected as the given radio 106, to which a response command 510 is to be transmitted based on any capabilities of the user of the second radio 106-3, the second radio 106-3 being the radio 106 closest to the first radio 104, the second radio 106-3 being in communication with the first radio 104 via the local communication link 118, a routing path from the computing device 102 to the second radio 106-3 having the best signal quality amongst routing paths to the other radios 106, among other possibilities.

It is understood in FIG. 5 that the computing device 102 determines (e.g., at the block 306 of the process 300) a routing path 512 to the second radio 106-3, for example, as depicted, the network communication link 116 between the radios 106-1, 106-3.

As also depicted in FIG. 5, the response command 510 includes a location of the first radio 104 (e.g., "Location of 104") and is transmitted by the computing device 102 (e.g., at the block 308 of the process 300) to the second radio 106-3 via the routing path 512. As such, the second radio 106-3 receives the response command 510 and may travel to the first radio 104 and/or activate the camera and/or microphone at the first radio 104 as described above. In some alternative examples, the computing device 102, and/or the second radio 106-3, may further transmit, to the first radio 104, an indication that the second radio 106-3 is being assigned and/or instructed to travel to a respective location of the first radio 104 to respond to the indication 402 of distress. In yet alternative examples, the computing device 102, and/or the second radio 106-3, may further transmit, to the other radios 106, an indication that the second radio 106-3 is being assigned and/or instructed to travel to a respective location of the first radio 104 to respond to the indication 402 of distress.

As mentioned above, the incident commander 112 may actuate the link 404 to see the other group of radios in the further visualization and such that a similar response command is transmitted to assist a user of radio from which an indication of distress has been received.

Figure 6:
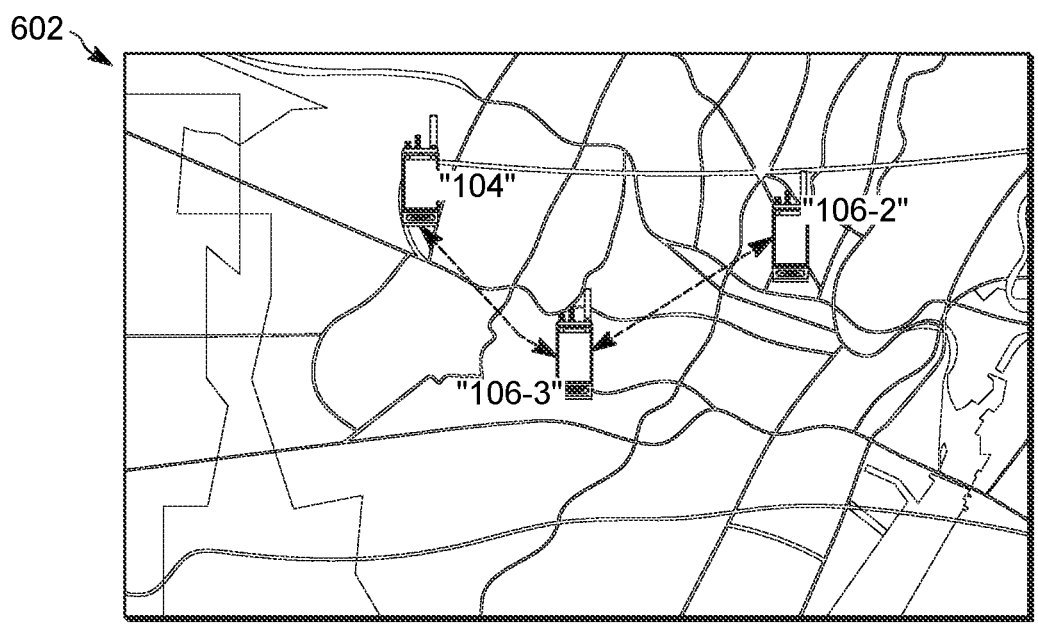
FIG. 6 depicts an example of a visualization, which may be provided at a radio when only local communication links are available, in accordance with some examples.

Attention is next directed to FIG. 6, which depicts a visualization 602, which may be provided at the second radio 106-3 (e.g., at a display screen thereof) when a communication network for the coverage area 108 fails, and the like such that only local communication links are available. For example, as depicted, the visualization 602 shows radios 104, 106-2 with which the second radio 106-3 is in communication via local communication links, depicted as double-ended arrows in dashed lines, similar to as described above. In this manner, a user of the second radio 106-3 may initiate communication with the radios 104, 106-2, and/or receive indications of distress therefrom, and the like, similar to as described above. Also similar to as described above, user of the second radio 106-3 may interact with the visualization 602 using a local input device, voice commands and the like.

Yet further alternatives are within the scope of the present specification. For example, the computing device 102 may track and/or store an indication that the second radio 106-3 has been assigned to assist the first radio 104. As such, when a further radio transmits an indication of distress to the computing device 102, the computing device 102 may assign another radio 106 (e.g., different from the second radio 106-3) to assist the further radio. The computing device 102 may transmit one or more indications to the radios 106 indicating which radios 106 have been assigned to assist the various radios from which indications of distress were received.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot transmit a response command to a radio, and cannot generate a visualization of locations of radios and communication links therebetween, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, Angular, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
generating, at a computing device, a visualization of respective locations of radios and communication links therebetween, the visualization distinguishing between the radios that are inside a coverage area of a communication network and a first radio that is outside of the coverage area, the visualization indicating a second radio in communication with the first radio via a local communication link;
detecting, at the computing device, an input indicating a response command associated with the first radio;
determining, at the computing device, a routing path from the computing device to a given radio of the radios that are inside the coverage area; and
transmitting, from the computing device, to the given radio, via the routing path, the response command.

2. The method of claim 1, further comprising:
detecting a selection of the given radio.

3. The method of claim 1, further comprising:
automatically determining the second radio, in communication with the first radio via the local communication link, as the given radio inside the coverage area to which the response command is transmitted.

4. The method of claim 1, further comprising:
receiving, at the computing device, from the radios, discovery information including the respective locations of the radios and indications of types of the communication links, the types of the communication links depending on whether the radios are inside or outside the coverage area,
wherein the visualization is generated from the discovery information.

5. The method of claim 4, wherein the discovery information further comprises one or more of:
signal strength measured by one or more of the radios;
signal quality measured by one or more of the radios;
a number of hops between the radios on respective local communication links therebetween;
nearest neighbor radios of one or more of the radios;
respective radio types of the radios; and
respective capability of the radios.

6. The method of claim 4, further comprising:
receiving the discovery information in real-time; and
updating the visualization as updated discovery information is received.

7. The method of claim 1, further comprising receiving, from the first radio, an indication of distress, and wherein the response command comprises an instruction to one or more of:
generate, at the given radio, a notification of the indication of distress;
travel to a respective location of the first radio to respond to the indication of distress; and
cause the given radio to activate a monitoring device at the first radio, via the second radio and the local communication link, such that one or more of audio and video detected by the monitoring device is received at the given radio, from the first radio, via the second radio and the local communication link.

8. The method of claim 1, further comprising:
transmitting, from the computing device, to one or more of the radios, an indication of the visualization to cause a radio, that receives the indication of the visualization, to generate a local copy of the visualization.

9. The method of claim 1, further comprising:
determining that the given radio has disappeared from the visualization; and, in response:

transmitting, to the second radio that was at least previously in communication with the first radio via the local communication link, an instruction to travel to a last known respective location of the first radio.

10. The method of claim 1, wherein the radios are configured to communicate via the communication network and via respective local communication links therebetween, such that the routing path comprises one or more of:
the communication network; and
a minimum number of the respective local communication links between a radio associated with the computing device and the given radio.

11. The method of claim 1, wherein the visualization comprises a two-dimensional space or a three-dimensional space mapped to an incident region within which the radios are operating.

12. The method of claim 1, further comprising:
providing, at the visualization, a link to a further visualization of respective locations of other radios and respective communication links therebetween, which, when actuated, causes the visualization to be replaced by the further visualization.

13. The method of claim 1, further comprising:
in response to losing coverage by the communication network, updating the visualization to indicate the radios that are in communication via local communication links.

14. A device comprising:
a communication unit; and
a controller communicatively coupled to the communication unit, the controller configured to:
generate a visualization of respective locations of radios and communication links therebetween, the visualization distinguishing between the radios that are inside a coverage area of a communication network and a first radio that is outside of the coverage area, the visualization indicating a second radio in communication with the first radio via a local communication link;
detect an input indicating a response command associated with the first radio;
determine a routing path from the computing device to a given radio of the radios that are inside the coverage area; and
transmit, by the communication unit, to the given radio, via the routing path, the response command.

15. The device of claim 14, wherein the controller is further configured to one or more of:
detect a selection of the given radio; and
automatically determine the second radio, in communication with the first radio via the local communication link, as the given radio inside the coverage area to which the response command is transmitted.

16. The device of claim 14, wherein the controller is further configured to:
receive, from the radios, discovery information including the respective locations of the radios and indications of types of the communication links, the types of the communication links depending on whether the radios are inside or outside the coverage area,
wherein the visualization is generated from the discovery information.

17. The device of claim 14, wherein the controller is further configured to:
receive, from the first radio, an indication of distress, and wherein the response command comprises an instruction to one or more of:
generate, at the given radio, a notification of the indication of distress;
travel to a respective location of the first radio to respond to the indication of distress; and
cause the given radio to activate a monitoring device at the first radio, via the second radio and the local communication link, such that one or more of audio and video detected by the monitoring device is received at the given radio, from the first radio, via the second radio and the local communication link.

18. The device of claim 14, wherein the controller is further configured to:
transmit, to one or more of the radios, an indication of the visualization to cause a radio, that receives the indication of the visualization, to generate a local copy of the visualization.

19. The device of claim 14, wherein the controller is further configured to:
determine that the given radio has disappeared from the visualization; and, in response:
transmit, to the second radio that was at least previously in communication with the first radio via the local communication link, an instruction to travel to a last known respective location of the first radio.

20. The device of claim 14, wherein the radios are configured to communicate via the communication network and via respective local communication links therebetween, such that the routing path comprises one or more of:
the communication network; and
a minimum number of the respective local communication links between a radio associated with the computing device and the given radio.

* * * * *